W. E. ADAMS & C. B. HALL.
VALVE MOTION MECHANISM.
APPLICATION FILED JULY 28, 1914.
1,144,987.
Patented July 6, 1915.
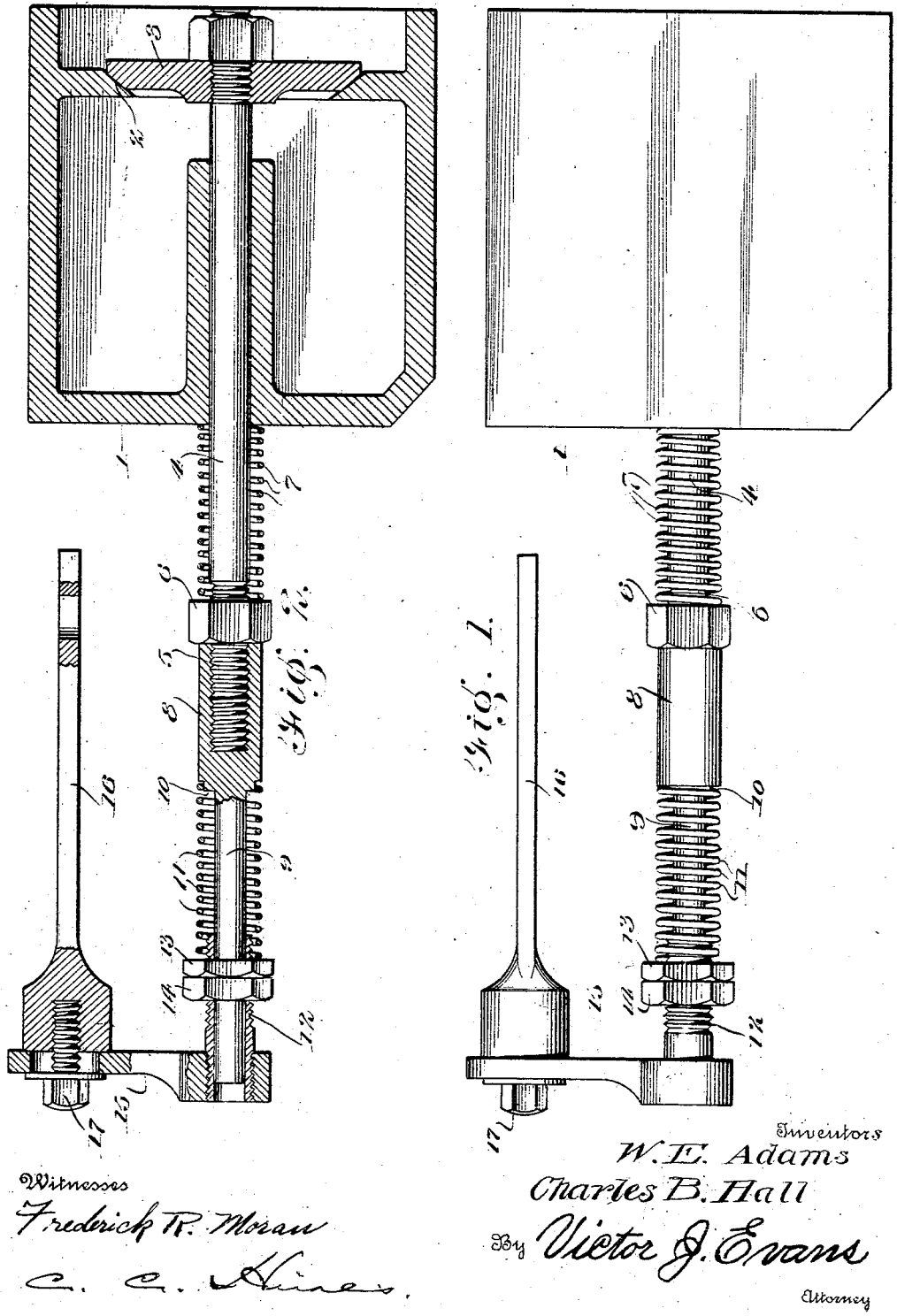
Inventors
W. E. Adams
Charles B. Hall
By Victor J. Evans
Attorney
Witnesses
Frederick R. Moran
C. C. Hines
UNITED STATES PATENT OFFICE.

WILLIAM E. ADAMS AND CHARLES B. HALL, OF TULSA, OKLAHOMA.

VALVE-MOTION MECHANISM.

1,144,987.  Specification of Letters Patent.  Patented July 6, 1915.

Application filed July 28, 1914.  Serial No. 853,719.

*To all whom it may concern:*

Be it known that we, WILLIAM E. ADAMS and CHARLES B. HALL, citizens of the United States, residing at Tulsa, in the county of Tulsa and State of Oklahoma, have invented new and useful Improvements in Valve-Motion Mechanism, of which the following is a specification.

This invention relates to improvements in valve motion mechanism for the inlet or exhaust valves of internal combustion engines, the object of the invention being to provide a novel type of motion transmitting means between the valve stem and cam-shaft-operated actuating member whereby a gradual and positive valve opening motion, free from jerks and jars is secured, a positive subsequent closing of the valve insured, and ample capacity for adjustment to compensate for wear, etc., provided for.

The invention consists of the features of construction, combination and arrangement of parts herein fully described and claimed, reference being had to the accompanying drawing in which—

Figure 1 is a view in elevation of the valve and improved valve motion mechanism. Fig. 2 is a longitudinal section of the same.

Referring to the drawing, 1 designates the valve cage or chamber provided with a port having a seat 2 against which the valve 3 is adapted to close. The valve 3 is connected with one end of a stem 4 projecting exteriorly of the valve chamber and threaded at its outer end, as shown at 5. The said threaded end 5 of the valve stem 4 receives a nut 6, and surrounding said stem between the nut and valve chamber is coiled a valve closing spring 7, the tension of which may be regulated by adjustment of the nut to govern the action of the valve.

The threaded end 5 of the valve stem enters an internally threaded socket 8 upon the inner end of a push rod 9, and is thus rendered adjustably connected with said rod for the purpose of taking up wear and compensating for variations in the action of the parts of the valve motion mechanism. The said socket 8 is of greater diameter than the body or outer end of said rod 9 and forms an abutment shoulder 10 against which bears one end of a coiled motion transmitting spring 11. The other end of this spring 11 surrounds the inner end of a sliding sleeve 12 externally threaded to receive an adjusting nut 13 and a check or lock nut 14.

This sleeve slidably engages the outer end of the rod 9 and is normally held in a predetermined position by the expansion of the spring 11, which is disposed between said shoulder 10 and the nut 13.

The sleeve 12 is connected at its outer end with one end of a laterally extending yoke 15, which is adjustably connected at its outer end with a motion transmitting member 16, which extends in parallel relation to the valve stem and push rod and is suitably operated in practice from the valve actuating cam shaft of the engine. The adjustable connection 17 between the yoke 15 and member 16 is of a type to permit relative adjustment between said member 16 and the valve stem and push rod to dispose the same a greater or less distance apart, within certain limits, as occasion may require to suit varying conditions or to compensate for wear.

It is to be understood that in the operation of the engine the motion transmitting member is moved longitudinally inwardly and outwardly, in a direction toward and from the valve chamber and parallel with the valve stem and push rod, and on its inward movement transmits opening motion to the valve 3, the valve being closed on the outward movement of said motion transmitting member by the action of the spring 7, the spring 11 serving on the inward motion of the member 16 to transmit motion therefrom to the push rod and on the closing movement of the valve to return the sleeve 12 and member 16 to normal position in which the valve is closed during a certain portion of the cycle of action of the engine.

On the inward movement of the member 16 it will be observed that the sleeve 12 is moved inwardly on the rod 9 and gradually compresses the spring 11 and transmits motion therethrough to the rod 9 and stem 4 to open the valve, whereby an easy, gradual and uniform valve opening motion, free from shocks, jerks and jars is obtained, thus preventing the valve from chattering on its seat, taking up all ordinary lost motion due to wear, and insuring a positive movement of the valve to the requisite degree without strain or irregularities of action of any kind. The spring 11 in reacting slides the sleeve 12 outward, and thus also allows the valve to be gradually and easily closed by the action of the spring 7, such gradual and easy opening and closing actions preventing objectionable noise from the passage of the flowing fuel or gases as well as spasmodic flow of the same. All liability of damage to the working parts from irregular motions is also obviated, while through the nut 12 the tension of the spring 11 may be regulated to secure an accurate degree of working action.

We claim:—

1. In a valve motion mechanism for engines, the combination of a valve, a sliding valve stem, a push rod having a threaded adjustable connection at one end with the stem, a jam nut associated with such connection, a coiled spring surrounding the valve stem between said nut and a part of the valve casing for normally holding the valve closed, and adapted to be tensioned by said nut, a sleeve slidably engaging the other end of the push rod, abutment and jam nuts in threaded engagement with said sleeve, a coiled cushioning spring surrounding the push rod between said nuts and a shoulder on said rod and forming a yielding transmitting connection between the sleeve and push rod, said spring adapted to be tensioned by said nuts and means connected with said sleeve for transmitting valve opening motion thereto.

2. In a valve motion mechanism for engines, the combination of a valve, a sliding valve stem, a spring acting thereon to hold the valve closed, a push rod directly connected with the valve stem, a sleeve slidably engaging said rod, a motion transmitting spring between said sleeve and push rod, a yoke connected with and extending at right angles from the sleeve, and an actuating member extending at right angles from the yoke, parallel with the rod and adjustable upon said yoke with relation to the rod.

In testimony whereof we affix our signatures in presence of two witnesses.

WILLIAM E. ADAMS.
CHARLES B. HALL.

Witnesses:
T. D. EVANS,
H. B. SMITH.

Copies of this patent may be obtained for five cents each, by addressing the "Commissioner of Patents, Washington, D. C."